US012522177B2

(12) United States Patent
Sharma et al.

(10) Patent No.: US 12,522,177 B2
(45) Date of Patent: Jan. 13, 2026

(54) AUTOMATED VEHICLE READINESS AND UPFITTING MONITORING FOR EFFICIENT FLEET MANAGEMENT

(71) Applicant: GM Global Technology Operations LLC, Detroit, MI (US)

(72) Inventors: Manoj Kumar Sharma, Troy, MI (US); Akilesh Rajavenkatanarayanan, Macomb, MI (US); Kiran Babu, Detroit, MI (US); Jonathon Markowski, Royal Oak, MI (US); Tetyana Wasko, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 49 days.

(21) Appl. No.: 18/665,729

(22) Filed: May 16, 2024

(65) Prior Publication Data

US 2025/0353463 A1    Nov. 20, 2025

(51) Int. Cl.
*G07C 5/00* (2006.01)
*B60R 25/102* (2013.01)
*B60R 25/31* (2013.01)
*G06Q 50/40* (2024.01)

(52) U.S. Cl.
CPC ............ *B60R 25/102* (2013.01); *B60R 25/31* (2013.01); *G06Q 50/40* (2024.01); *G07C 5/008* (2013.01)

(58) Field of Classification Search
CPC ...... B60R 25/102; B60R 25/31; G06Q 50/40; G07C 5/008
See application file for complete search history.

(56) References Cited

U.S. PATENT DOCUMENTS

| | | | |
|---|---|---|---|
| 5,751,246 A * | 5/1998 | Hertel | G01S 5/0027 340/8.1 |
| 2013/0035788 A1* | 2/2013 | Divelbiss | G05B 15/02 701/99 |
| 2013/0090781 A1* | 4/2013 | Gellatly | B60R 25/25 701/2 |
| 2020/0269859 A1* | 8/2020 | Blank | G05D 1/0027 |

* cited by examiner

*Primary Examiner* — Ian Jen
(74) *Attorney, Agent, or Firm* — Vivacqua Crane, PLLC (57) ABSTRACT

A system for automated vehicle readiness and upfitting monitoring for efficient fleet management includes sensors equipped to vehicles. Each sensor has a distinct field of view of a vehicle or of surroundings of the vehicles. A human machine interface (HMI) accessible by a vehicle fleet manager, a cloud computing server, and a controller are in communication with each other and with the vehicles. The controller executes a fleet management application (FMA) with a first control logic for authorized person detection (APD); a second control logic for cargo and upfitting (CU) management; and a third control logic for vehicle daily readiness (VDR) management. Outputs from the first, second and third control logics are transmitted to the HMI and the cloud computing server, and the FMA suggests a vehicle downtime mitigation strategy to the fleet manager based on the outputs from the first, second, and third control logics.

20 Claims, 5 Drawing Sheets

AUTOMATED VEHICLE READINESS AND UPFITTING MONITORING FOR EFFICIENT FLEET MANAGEMENT

INTRODUCTION

The present disclosure relates to systems and methods for monitoring a state of a vehicle, and more specifically, to systems and methods for monitoring and reporting vehicle access, location, upfitting, and task readiness statuses. Vehicle fleet management is increasingly important as vehicles are used more and more frequently and widely for deliveries of goods and services across a wide spectrum of business fields. In order to effectively manage a fleet of vehicles, understanding of vehicle status, location, and downtime is useful.

While current systems and methods for monitoring fleet vehicle states achieve their intended purpose, there is a need for a new and improved system and method for monitoring fleet vehicle status that makes use of preexisting or retrofittable hardware, mitigates vehicle downtime, optimizes vehicle lifetime usage, decreases the potential for unauthorized vehicle use, decreases a potential for tampering with vehicles and vehicle contents, and tracks vehicle utilization without increasing system complexity.

SUMMARY

According to several aspects of the present disclosure a system for automated vehicle readiness and upfitting monitoring for efficient fleet management includes at least one vehicle. A plurality of sensors are disposed on the at least one vehicle and collect real-time information about the at least one vehicle and surroundings of the at least one vehicle. Each of the plurality of sensors has a distinct field of view of the at least one vehicle or of the surroundings of the at least one vehicle. The system further includes a human machine interface (HMI) accessible by a vehicle fleet manager, as well as a cloud computing server, and a controller having a processor, a memory, and one or more input/output (I/O) ports. The I/O ports communicate with the plurality of sensors, the HMI and the cloud computing server. The processor executes programmatic control logic stored in the memory. The programmatic control logic includes a fleet management application (FMA) having a first control logic for authorized person detection (APD); a second control logic for cargo and upfitting (CU) management; and a third control logic for vehicle daily readiness (VDR) management. Outputs from the first, second and third control logics are transmitted via the I/O ports either directly or indirectly to the HMI and the cloud computing server. The FMA generates a suggested vehicle downtime mitigation strategy to the vehicle fleet manager based on the outputs from the first, second, and third control logics.

In another aspect of the present disclosure the first control logic further includes control logic that causes the vehicle fleet manager to populate a database of people who are authorized users of the at least one vehicle. The database is hosted on the cloud computing server.

In yet another aspect of the present disclosure, the first control logic further includes control logic that utilizes the plurality of sensors to monitor the at least one vehicle and the surroundings of the at least one vehicle, and control logic that, from data from the plurality of sensors, determines that the at least one vehicle is parked. The first control logic further includes control logic that detects movement within one or more fields of view of the plurality of sensors; and control logic that determines that a person is approaching or is within the at least one vehicle.

In yet another aspect of the present disclosure the first control logic further includes control logic that analyzes sensor data and compares the person approaching or within the at least one vehicle to profiles of authorized users stored in the database of authorized users of the at least one vehicle, and control logic that generates a notification to the HMI based on unusual or unexpected acts by authorized persons interacting with the at least one vehicle. The first control logic further includes control logic that actively and immediately generates a notification to the HMI that informs the vehicle fleet manager that an unauthorized person is interacting with the at least one vehicle, continuously records actions taken by the unauthorized person, and prepares a detailed report of the unauthorized person's actions; and control logic that generates a suggested response to unauthorized use of the at least one vehicle by either an authorized person or an unauthorized person.

In yet another aspect of the present disclosure the second control logic further includes control logic that, from data from the plurality of sensors, determines that the at least one vehicle is being upfitted. The second control logic further includes control logic that utilizes the plurality of sensors to continuously monitor the at least one vehicle and the surroundings of the at least one vehicle; and control logic that analyzes the data from the plurality of sensors and compares the data from the plurality of sensors to predetermined upfitting target information.

In yet another aspect of the present disclosure the control logic that analyzes the data from the plurality of sensors further includes one or more of an artificial intelligence (AI) algorithm, a machine learning (ML) algorithm, and a deep neural network (DNN) algorithm including an object detection algorithm; and compares a quantity and placement of materials, supplies, tools, fixtures, and equipment on or within the at least one vehicle to the predetermined upfitting target for each upfitting purpose selected by the vehicle fleet manager.

In yet another aspect of the present disclosure the second control logic further includes control logic that determines an upfitting completion status and generates a notification to the HMI that informs the vehicle fleet manager of the upfitting completion status. The second control logic further includes control logic that generates and transmits to the HMI a report including the information about the upfitting work that has been completed, including: addition, removal, tampering with, or movement of materials, tools, supplies, equipment, and fixtures within or on the at least one vehicle; and control logic that selectively reports that the upfitting work on the at least one vehicle has been completed or that the upfitting work has not been completed, depending on whether the upfitting target has been achieved.

In yet another aspect of the present disclosure the second control logic further includes control logic that, upon determining that the upfitting target has not been achieved, engages the suggested vehicle downtime mitigation strategy to reduces downtime or idle time for each of the at least one vehicles that has not been completely upfit from a first level to a second level less than the first level by: notifying the vehicle fleet manager of one or more possible alternate use cases for each of the at least one vehicles for which upfitting work is incomplete; and causing the vehicle fleet manager to select at least one of the one or more possible alternate use cases.

In yet another aspect of the present disclosure the third control logic further includes control logic that receives, from the HMI, a command from the vehicle fleet manager that assigns one or more tasks to the at least one vehicle, and control logic that, from data from the plurality of sensors, determines that the at least one vehicle is properly equipped for an assigned task. The third control logic further includes control logic that activates the plurality of sensors and causes the sensors to monitor the at least one vehicle and the surroundings of the at least one vehicle; and control logic that analyzes the data from the plurality of sensors and compares the data from the plurality of sensors to predetermined requirements for the assigned task.

In yet another aspect of the present disclosure the control logic that analyzes the data from the plurality of sensors further includes one or more of an artificial intelligence (AI) algorithm, a machine learning (ML) algorithm, and a deep neural network (DNN) algorithm including an object detection algorithm; and compares a quantity and placement of materials, supplies, tools, fixtures, and equipment on or within the at least one vehicle to the predetermined requirements for the assigned task.

In yet another aspect of the present disclosure the third control logic further includes control logic that, from the quantity and placement of materials, supplies, tools, fixtures, and equipment on or within the at least one vehicle and the predetermined requirements for the assigned task, determines an vehicle daily readiness status and generates a notification to the HMI that informs the vehicle fleet manager of the vehicle daily readiness status of the at least one vehicle. The third control logic further includes control logic that selectively generates and transmits, to the HMI, a report including a "check completed" notification, or a "ready to go" notification, when the at least one vehicle satisfies the predetermined requirements for the assigned task; and control logic that selectively generates and transmits, to the HMI, a detailed report of an assigned task readiness status of the at least one vehicle in relation to a current status of the materials, supplies, tools, fixtures, and equipment on or within the at least one vehicle when the at least one vehicle does not satisfy the predetermined requirements for the assigned task.

In yet another aspect of the present disclosure a method for automated vehicle readiness and upfitting monitoring for efficient fleet management includes collecting real-time information about at least one vehicle and surroundings of the at least one vehicle with a plurality of sensors equipped to the at least one vehicle, each of the plurality of sensors having a distinct field of view of the at least one vehicle or of the surroundings of the at least one vehicle. The method further includes accessing, by a vehicle fleet manager, a human machine interface (HMI), and executing programmatic control logic stored in memory of a controller, the controller having a processor, and one or more input/output (I/O) ports, the I/O ports communicating with the plurality of sensors, the HMI and a cloud computing server, the programmatic control logic including a fleet management application (FMA). The FMA includes control logic for: performing authorized person detection (APD); performing cargo and upfitting (CU) management; and performing vehicle daily readiness (VDR) management. The FMA further includes control logic for generating and transmitting, via the I/O ports, either directly or indirectly to the HMI and the cloud computing server, outputs from the APD, CU management and VDR management, including a suggested vehicle downtime mitigation strategy viewable by the vehicle fleet manager.

In yet another aspect of the present disclosure the method further includes causing the vehicle fleet manager to populate a database, of people who are authorized users of the at least one vehicle, the database hosted on the cloud computing server; and utilizing the plurality of sensors to monitor the at least one vehicle and the surroundings of the at least one vehicle. The method further includes determining, from data from the plurality of sensors, that the at least one vehicle is parked; detecting, with the plurality of sensors, movement within one or more fields of view of the plurality of sensors; and determining that a person is approaching or is within the at least one vehicle.

In yet another aspect of the present disclosure the method further includes analyzing sensor data and compares the person approaching or within the at least one vehicle to profiles of authorized users stored in the database of authorized users of the at least one vehicle; and generating a notification to the HMI based on unusual or unexpected acts by authorized persons interacting with the at least one vehicle. The method further includes actively and immediately generating a notification to the HMI that informs the vehicle fleet manager that an unauthorized person is interacting with the at least one vehicle, continuously records actions taken by the unauthorized person, and prepares a detailed report of the unauthorized person's actions; and generating a suggested response to unauthorized use of the at least one vehicle by either an authorized person or an unauthorized person.

In yet another aspect of the present disclosure the method further includes determining, from data from the plurality of sensors, that the at least one vehicle is being upfitted; and utilizing the plurality of sensors to continuously monitor the at least one vehicle and the surroundings of the at least one vehicle. The method further includes analyzing the data from the plurality of sensors and comparing the data from the plurality of sensors to predetermined upfitting target information by executing one or more of an artificial intelligence (AI) algorithm, a machine learning (ML) algorithm, and a deep neural network (DNN) algorithm including an object detection algorithm to compare a quantity and placement of materials, supplies, tools, fixtures, and equipment on or within the at least one vehicle to the predetermined upfitting target for each upfitting purpose selected by the vehicle fleet manager.

In yet another aspect of the present disclosure the method further includes determining an upfitting completion status and generating a notification to the HMI that informs the vehicle fleet manager of the upfitting completion status; and generating and transmits to the HMI a report including the information about the upfitting work that has been completed, including: addition, removal, tampering with, or movement of materials, tools, supplies, equipment, and fixtures within or on the at least one vehicle. The method further includes selectively reporting that the upfitting work on the at least one vehicle has been completed or that the upfitting work has not been completed, depending on whether the upfitting target has been achieved.

In yet another aspect of the present disclosure the method further includes engaging, upon determining that the upfitting target has not been achieved, the suggested vehicle downtime mitigation strategy to reduce downtime or idle time for each of the at least one vehicles that has not been completely upfit from a first level to a second level less than the first level by: notifying the vehicle fleet manager of one or more possible alternate use cases for each of the at least one vehicles for which upfitting work is incomplete; and causing the vehicle fleet manager to select at least one of the one or more possible alternate use cases.

In yet another aspect of the present disclosure the method further includes receiving, from the HMI, a command from the vehicle fleet manager that assigns one or more tasks to the at least one vehicle; and determining, from data from the plurality of sensors, that the at least one vehicle is properly equipped for an assigned task. The method further includes activating the plurality of sensors and causes the sensors to monitor the at least one vehicle and the surroundings of the at least one vehicle; and analyzing the data from the plurality of sensors and compares the data from the plurality of sensors to predetermined requirements for the assigned task by executing one or more of an artificial intelligence (AI) algorithm, a machine learning (ML) algorithm, and a deep neural network (DNN) algorithm including an object detection algorithm to compare a quantity and placement of materials, supplies, tools, fixtures, and equipment on or within the at least one vehicle to the predetermined requirements for the assigned task.

In yet another aspect of the present disclosure the method further includes determining, from the quantity and placement of materials, supplies, tools, fixtures, and equipment on or within the at least one vehicle and the predetermined requirements for the assigned task, a vehicle daily readiness status and generating a notification to the HMI that informs the vehicle fleet manager of the vehicle daily readiness status of the at least one vehicle. The method further includes selectively generating and transmitting, to the HMI, a report including a "check completed" notification, or a "ready to go" notification, when the at least one vehicle satisfies the predetermined requirements for the assigned task; and selectively generating and transmitting, to the HMI, a detailed report of an assigned task readiness status of the at least one vehicle in relation to a current status of the materials, supplies, tools, fixtures, and equipment on or within the at least one vehicle when the at least one vehicle does not satisfy the predetermined requirements for the assigned task.

In yet another aspect of the present disclosure a method for automated vehicle readiness and upfitting monitoring for efficient fleet management includes collecting real-time information about at least one vehicle and surroundings of the at least one vehicle with a plurality of sensors equipped to the at least one vehicle, each of the plurality of sensors having a distinct field of view of the at least one vehicle or of the surroundings of the at least one vehicle. The method further includes accessing, by a vehicle fleet manager, a human machine interface (HMI), and executing programmatic control logic stored in memory of a controller, the controller having a processor, and one or more input/output (I/O) ports, the I/O ports communicating with the plurality of sensors, the HMI and a cloud computing server. The programmatic control logic includes a fleet management application (FMA) including control logic for: performing authorized person detection (APD), performing cargo and upfitting (CU) management, and performing vehicle daily readiness (VDR) management. The APD includes control logic for causing the vehicle fleet manager to populate a database of people who are authorized users of the at least one vehicle, the database hosted on the cloud computing server; utilizing the plurality of sensors to monitor the at least one vehicle and the surroundings of the at least one vehicle; and determining, from data from the plurality of sensors, that the at least one vehicle is parked. The APD further includes control logic for detecting, with the plurality of sensors, movement within one or more fields of view of the plurality of sensors; determining that a person is approaching or is within the at least one vehicle, and analyzing sensor data and compares the person approaching or within the at least one vehicle to profiles of authorized users stored in the database of authorized users of the at least one vehicle. The APD further includes control logic for generating a notification to the HMI based on unusual or unexpected acts by authorized persons interacting with the at least one vehicle; and actively and immediately generating a notification to the HMI that informs the vehicle fleet manager that an unauthorized person is interacting with the at least one vehicle, continuously records actions taken by the unauthorized person, and prepares a detailed report of the unauthorized person's actions. The APD further includes control logic for generating a suggested response to unauthorized use of the at least one vehicle by either an authorized person or an unauthorized person. The CU management control logic further includes control logic for determining, from data from the plurality of sensors, that the at least one vehicle is being upfitted, and utilizing the plurality of sensors to continuously monitor the at least one vehicle and the surroundings of the at least one vehicle. The CU management control logic further includes control logic for analyzing the data from the plurality of sensors and comparing the data from the plurality of sensors to predetermined upfitting target information by executing one or more of an artificial intelligence (AI) algorithm, a machine learning (ML) algorithm, and a deep neural network (DNN) algorithm including an object detection algorithm to compare a quantity and placement of materials, supplies, tools, fixtures, and equipment on or within the at least one vehicle to the predetermined upfitting target for each upfitting purpose selected by the vehicle fleet manager. The CU management control logic further includes control logic for determining an upfitting completion status and generating a notification to the HMI that informs the vehicle fleet manager of the upfitting completion status; and generating and transmits to the HMI a report including the information about the upfitting work that has been completed, including: addition, removal, tampering with, or movement of materials, tools, supplies, equipment, and fixtures within or on the at least one vehicle. The CU management control logic further includes control logic for selectively reporting that the upfitting work on the at least one vehicle has been completed or that the upfitting work has not been completed, depending on whether the upfitting target has been achieved, and upon determining that the upfitting target has not been achieved, engaging a suggested vehicle downtime mitigation strategy to reduce downtime or idle time for each of the at least one vehicles that has not been completely upfit from a first level to a second level less than the first level by: notifying the vehicle fleet manager of one or more possible alternate use cases for each of the at least one vehicles for which upfitting work is incomplete; and causing the vehicle fleet manager to select at least one of the one or more possible alternate use cases. The VDR management control logic further includes control logic for receiving, from the HMI, a command from the vehicle fleet manager that assigns one or more tasks to the at least one vehicle; and determining, from data from the plurality of sensors, that the at least one vehicle is properly equipped for an assigned task. The VDR management control logic further includes control logic for activating the plurality of sensors and causes the sensors to monitor the at least one vehicle and the surroundings of the at least one vehicle, and for analyzing the data from the plurality of sensors and compares the data from the plurality of sensors to predetermined requirements for the assigned task by executing one or more of an artificial intelligence (AI) algorithm, a machine learning (ML) algorithm, and a deep neural network (DNN) algorithm including an object detection algorithm to compare a quantity and placement of materials, supplies, tools, fixtures, and equipment on or within the at least one vehicle to the predetermined requirements for the assigned task. The VDR management control logic further includes control logic for determining, from the quantity and placement of materials, supplies, tools, fixtures, and equipment on or within the at least one vehicle and the predetermined requirements for the assigned task, a vehicle daily readiness status and generating a notification to the HMI that informs the vehicle fleet manager of the vehicle daily readiness status of the at least one vehicle. The VDR management control logic further includes control logic for selectively generating and transmitting, to the HMI, a report including a "check completed" notification, or a "ready to go" notification, when the at least one vehicle satisfies the predetermined requirements for the assigned task; and selectively generating and transmitting, to the HMI, a detailed report of the assigned task readiness status of the at least one vehicle in relation to a current status of the materials, supplies, tools, fixtures, and equipment on or within the at least one vehicle when the at least one vehicle does not satisfy the predetermined requirements for the assigned task. The VDR management control logic further includes control logic for generating and transmitting, via the I/O ports, either directly or indirectly to the HMI and the cloud computing server, outputs from the APD, CU management and VDR management, including a suggested vehicle downtime mitigation strategy viewable by the vehicle fleet manager.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
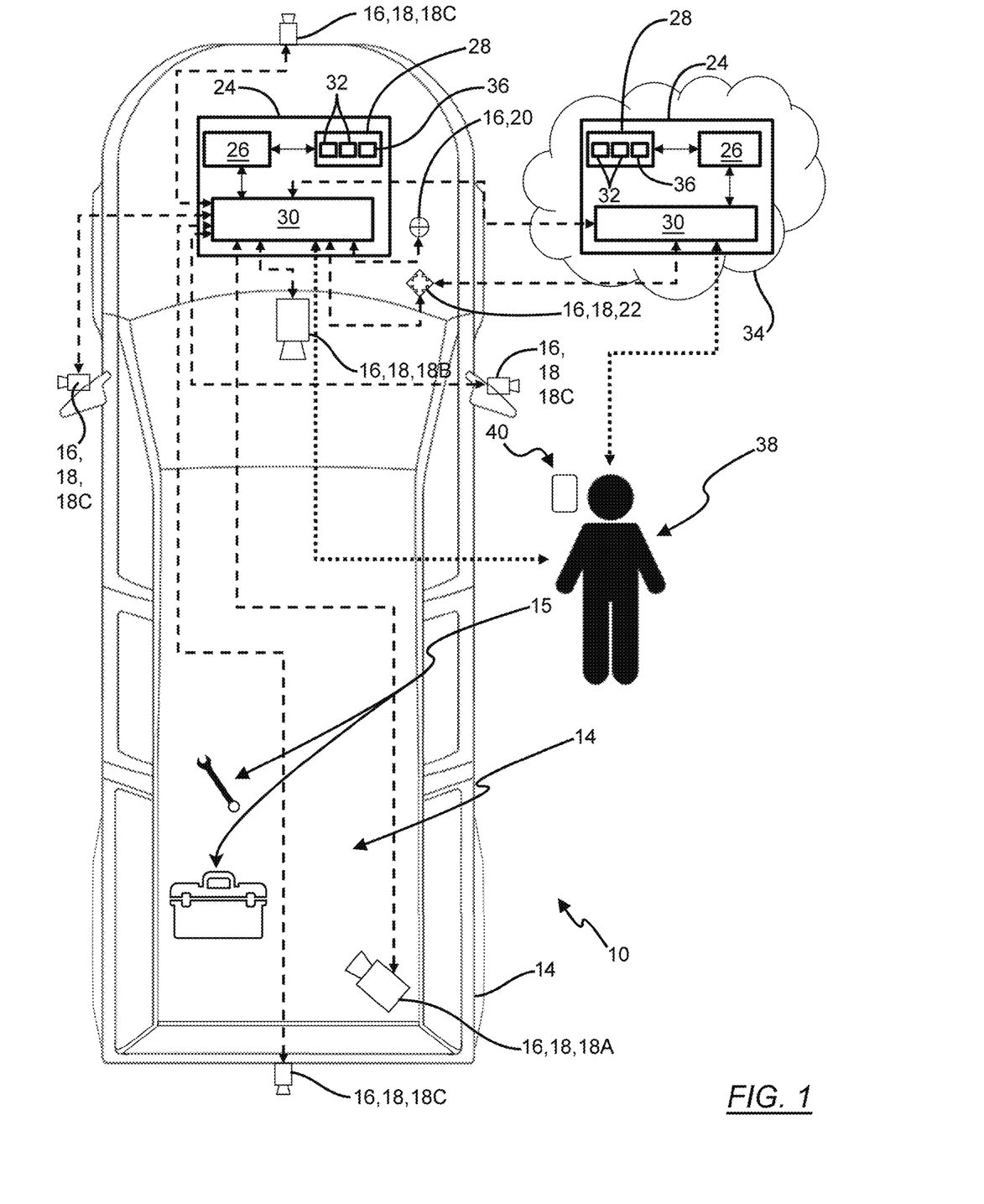
FIG. 1 is a schematic diagram of a system and method for automated vehicle readiness and upfitting monitoring for efficient fleet management according to an exemplary embodiment.

Referring to FIG. 1, a system 10 for automated vehicle 12 readiness and upfitting monitoring for efficient fleet management is shown in schematic form. The system 10 operates on the vehicle 12. While the vehicle 12 shown is a van, it should be appreciated that the vehicle 12 may be any type of vehicle 12 without departing from the scope or intent of the present disclosure. In some examples, the vehicle 12 may be a van, a bus, a semi, a tractor-trailer, an SUV, a truck, an airplane, a helicopter, an amphibious vehicle, a boat or ship, a bicycle, a motorcycle, a tricycle, or any other type of vehicle 12. The vehicle 12 shown in FIG. 1 further includes a cargo compartment 14. The cargo compartment 14 defines an interior volume of the vehicle 12 designed for storage and transport of cargo 15, goods, tools, and the like. It will be appreciated that the cargo compartments 14 of various vehicle 12 types within the scope of the current disclosure may vary substantially. That is, the cargo compartment 14 of a semi or tractor-trailer may define a very large and substantially rectangular-prism-shaped volume in relation to a more abnormally-shaped and significantly smaller cargo compartment 14 that may be defined by paniers, sidesaddles or the like of a bicycle or motorcycle. Similarly, a cargo compartment 14 of a helicopter, airplane, or boat or a ship may be substantially different in both size and shape than that of the van displayed in FIG. 1.

Furthermore, in the example shown in FIG. 1, the vehicle 12 is equipped with one or more sensors 16 detecting information about the vehicle 12. The sensors 16 may include any of a wide variety of sensors 16 or sensor 16 types without departing from the scope or intent of the present disclosure. In several examples, the sensors 16 may include motion sensors 16 including but not limited to: microwave sensors, infrared sensors, ultrasonic sensors, vibration sensors, or one or more cameras 18, each having a distinct field of view (FOV) in relation to the other cameras 18. In FIG. 1, the vehicle 12 is equipped with at least one cargo compartment camera 18A and at least one passenger compartment camera 18B. Additional cameras 18 including surround-view cameras 18C may also be equipped to the vehicle 12 without departing from the scope or intent of the present disclosure. Surround-view cameras 18C have FOVs that extend around the vehicle 12 upon which they are mounted, and are placed so as to collect image data about the surroundings of the vehicle 12, including detecting obstacles, people, pets, cargo, buildings, trees, road surfaces, curbs, and any of a wide variety of other aspects of the vehicle's 12 surrounding environment.

Additional sensors 14 such as inertial measurement units (IMUs) 20, global positioning system (GPS) sensors 22, and the like are also equipped to the vehicle 12. IMUs 20 measure movement, acceleration, and the like in several degrees of freedom. In a specific example, the IMUs 20 may measure a vehicle 12 position, movement, acceleration and the like in three or more degrees of freedom. GPS sensors 22 communicate with a network of global positioning satellites (not specifically shown) to determine and report a position of the GPS sensor 22 on Earth. It will be appreciated that GPS sensors 22 are commonly used in navigation applications, and to assist in determining locations of vehicles 12, packages, and the like. Accordingly, a GPS sensor 22 equipped to the vehicle 12 effectively reports a location of the vehicle 12 on Earth, or at least in relation to the network of global positioning satellites, even if the vehicle 12 is not on Earth.

The system 10 further includes one or more controllers 24. The controllers 24 are non-generalized electronic control devices having a preprogrammed digital computer or processor 26, non-transitory computer readable medium or memory 28 used to store data such as control logic, software applications, instructions, computer code, data, lookup tables, and the like. The controllers 24 further include one or more input/output (I/O) ports 30. Computer readable medium or memory 28 includes any type of medium capable of being accessed by a computer, such as read-only memory (ROM), random access memory (RAM), a hard disk drive, solid-state memory, a compact disc (CD), digital video disc (DVD), or any other type of memory 28. A non-transitory computer readable memory 28 excludes wired, wireless, optical, or other communication links that transport transitory electrical or other signals. A non-transitory computer readable memory 28 includes media where data can be permanently stored and media where data can be stored and later overwritten, such as a rewritable optical disc or an erasable memory device. Computer code includes any type of program code, including source code, object code, and executable code. The processor 26 is configured to execute the code or instructions. The vehicle 12 may have controllers 24 including a dedicated Wi-Fi controller, an engine control module, a transmission control module, a body control module, a suspension control module, a brake control module, an infotainment control module, or the like. The I/O ports 30 may be configured to communicate via wired communications, wirelessly via Wi-Fi protocols under IEEE 802.11x, cellular links and protocols such as global system for mobile communications (GSM), code division multiple access (CDMA), wireless in local loop (WLL), general packet radio services (GPRS), 1G, 2G, 3G, 4G long term evolution (LTE), 5G, and the like, as well as satellite links, and the like without departing from the scope or intent or the present disclosure.

The on-board controller 24 further includes one or more applications 32. An application 32 is a software program configured to perform a specific function or set of functions. The application 32 may include one or more computer programs, software components, sets of instructions, procedures, functions, objects, classes, instances, related data, or a portion thereof adapted for implementation in a suitable computer readable program code. The applications 32 may be stored within the memory 28 or in additional or separate memory 28. In several aspects, applications 32 may manage powertrain system functions, suspension system functions, brake system functions, aerodynamic system functions, steering system functions, and/or body control system functions in an exemplary vehicle 12. Applications 32 managing powertrain system functions, suspension system functions, brake system functions, aerodynamic system functions, steering system functions, and body control system functions in the vehicle 12 receive static and/or dynamic vehicle state information or sensory data from the suite of sensors 16 disposed on the vehicle 12. The sensory data may therefore include, but not be limited to: vehicle 12 position, vehicle 12 speed, vehicle 12 acceleration, vehicle 12 cargo compartment 14 imagery, and the like.

The system 10 further includes a back office or cloud-computing server 34, and may include additional infrastructure, such as one or more cellular towers (not specifically shown), cameras 16 mounted to infrastructure such as buildings, traffic signals, and the like (not specifically shown), and so forth. The cloud computing server 34 has a controller 24 having substantially the same structure as the on-board controller 24 of the vehicle 12. That is, the cloud computing server 34 includes a processor 26, memory 28, and one or more I/O ports 30. The vehicle's 12 sensors are in electronic communication with the on-board controller 24, and may further be in electronic communication either directly or indirectly with the cloud computing server 34 without departing from the scope or intent of the present disclosure.

Figure 2:
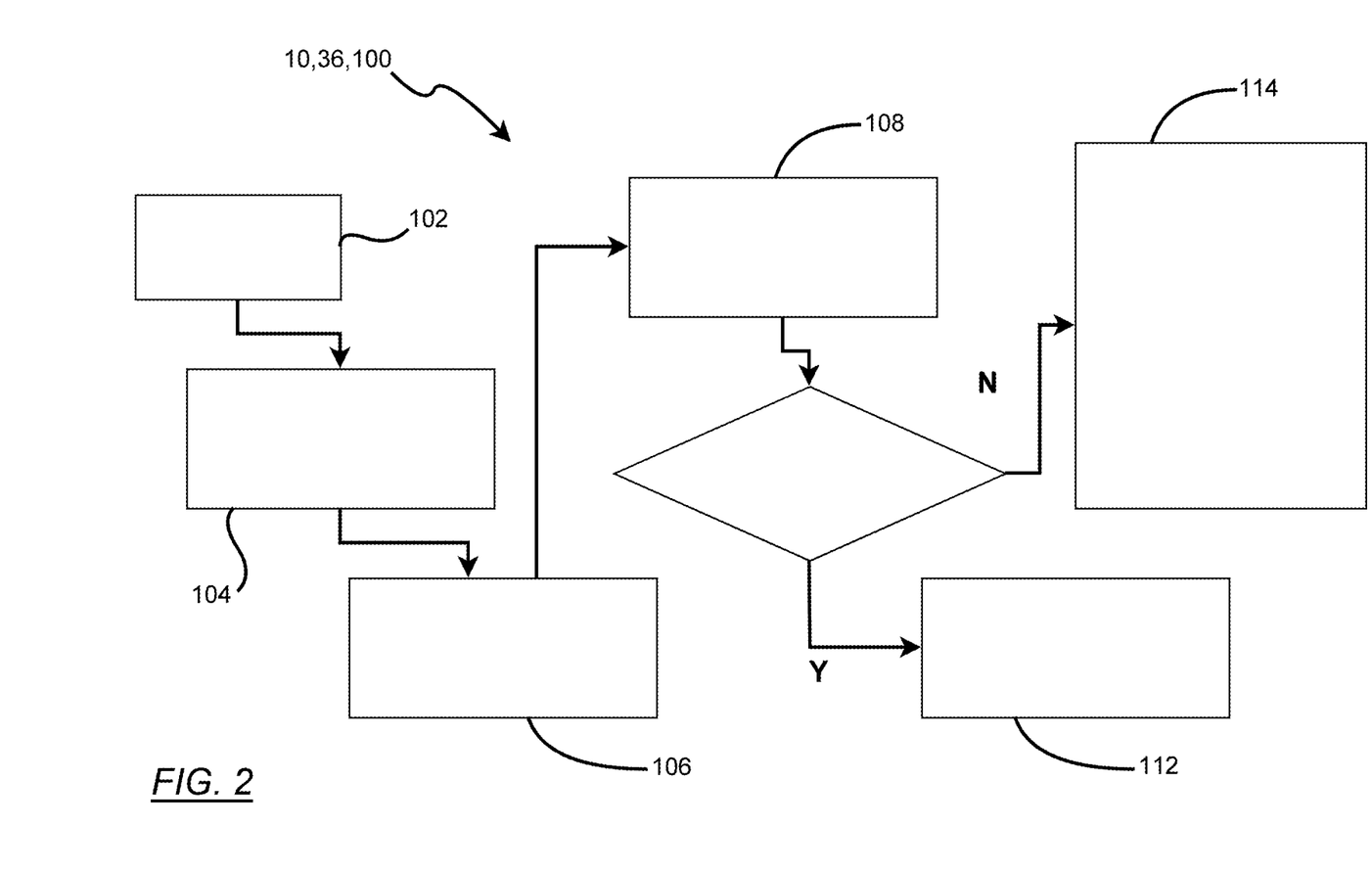
FIG. 2 is a flowchart depicting an authorized person detection control logic of the system and method for automated vehicle readiness and upfitting monitoring for efficient fleet management of FIG. 1 according to an exemplary embodiment.

Turning now to FIG. 2 and with continuing reference to FIG. 1, one of the applications 32 stored in memory 28 of the on-board controller 24 is shown in additional detail. The application 32 shown in FIG. 2 defines a fleet management application (FMA) 36 that monitors and reports automated vehicle 12 readiness and upfitting monitoring status to a fleet manager 38, thereby assisting the fleet manager and/or a vehicle 12 operator or driver in efficiently controlling one or more vehicles 12 of a fleet of vehicles 12 equipped with and operating as a part of the system 10. The fleet manager 38 may be a human as depicted in FIG. 1, or the fleet manager 38 may be an application 32 that automatically or semi-automatically manages a fleet of vehicles 12 within the system 10. In some examples, the fleet manager 38 is a human that utilizes one or more applications 32, including the FMA 36 to control various aspects of a fleet of vehicles 12 operating within the system 10. The fleet manager 38 accesses the FMA 36 via a Human Machine Interface (HMI) 40, such as a desktop or laptop computer, a mobile computing device such as a cellular phone, a tablet, or other such communications and computing device. It will be appreciated that the HMI 40 may be any of a wide variety of HMIs 40 without departing from the scope or intent of the present disclosure. In several aspects, the HMI 40 runs or otherwise supports the running of the system 10, and more specifically, at least a fleet management user interface portion of the FMA 36. In some examples, the HMI 40 may be in direct communication with the vehicle 12 via the I/O ports 30 of the vehicle's 12 controller 24, while in other examples, the HMI 40 may be in indirect communication with the vehicle 12 via the I/O ports 30 of the cloud computing server 34. In still further examples, the HMI 40 may simultaneously, sequentially, or periodically be in communication with each of the vehicle's 12 controller 24 and the controller 24 of the cloud computing server 34 without departing from the scope or intent of the present disclosure.

The FMA 36 collects data from the sensors 16 of the vehicle 12, and from infrastructure sources, such as cellular towers (not specifically shown), cameras 16 mounted to infrastructure such as buildings, traffic signals, and the like (not specifically shown), and utilizes data from the sensors 12 as inputs to an authorized person detection (APD) control logic 100 of the FMA 36. The APD control logic 100 begins at block 102 where the FMA 36 determines that a vehicle 12 within the fleet of managed vehicles 12 is parked. Park detection can be accomplished in a number of different manners, including but not limited to: ignition position detection, vehicle power status, movement detection, and the like. Upon determining that the vehicle 12 has been parked, the APD control logic 100 proceeds to block 104 where all available motion sensors 16 equipped to the vehicle 12, including cargo compartment camera 18A, passenger compartment camera 18B, and surround view cameras 18C are activated if and when motion is detected within the FOV of each of the sensors 16. Upon detecting motion within the FOV of one or more of the sensors 16, the APD control logic 100 proceeds to block 106 where cameras 18 capture images and/or video of the motion detected. In an example in which a person is moving within the FOV of one or more of the sensors 16, the APD control logic 100 at block 106 records images and video of the person as the person interacts with the vehicle 12. Subsequently at block 108, the APD control logic 100 analyzes the captured images and video and compares the person detected within the captured images and video to profiles of known or authorized persons. In examples, the algorithms used to analyze the captured images and video may include artificial intelligence (AI), machine learning (ML), deep neural network (DNN) algorithms, or the like. In further aspects, the algorithms may utilize techniques including facial recognition, gait recognition, or other biometric information to define the profiles of the authorized users and to compare the profiles of the authorized users people interacting with the vehicle 12 to determine whether or not a person interacting with the vehicle 12 is an authorized user.

The fleet manager 38 determines who is an authorized person and populates a database, hosted in the cloud computing server 34, of people who should have access to the vehicles 12 within the fleet either for specific or more general purposes. That is, the fleet manager 38 may determine that a person is authorized to load or unload a vehicle 12 within the fleet, but not drive the vehicle 12. By contrast, other persons may be authorized to perform vehicle 12 maintenance, upfitting, or the like, and may therefore be allowed to load, unload, modify, and drive the vehicle 12. Other authorized persons may have additional or different responsibilities vis-à-vis the vehicles 12 in the fleet of managed vehicles 12 without departing from the scope or intent of the present disclosure.

At block 110, upon determining that the person is an authorized person, the APD control logic 100 proceeds to block 112 where the sensors 16 continue to monitor and record information about the movements of the authorized person and will also flag unusual, unexpected, or otherwise unauthorized acts by the authorized person. In some examples, unusual or unexpected acts by an authorized person may include adding, removing, or even moving positions of materials or supplies within the vehicle 12 cargo compartment 14 without being instructed to do so by the fleet manager 38, other applications 32 controlled by the fleet manager 38, or the like.

However, when at block 110, the person is determined not to be an authorized person, the APD control logic 100 proceeds to block 114 where the APD control logic 100 causes the sensors 16 to continue to monitor and record information about the movements of the unauthorized person, actively and immediately alerts the fleet manager 38 in real-time of the unauthorized access to the vehicle 12, and prepares a detailed report including suggested response actions. In further aspects, the fleet manager 38 may alter notification and alert settings of the APD control logic 100 so that at block 110 when an unauthorized person interacts with the vehicle 12, law enforcement may be directly contacted under specific predefined circumstances.

Figure 3:
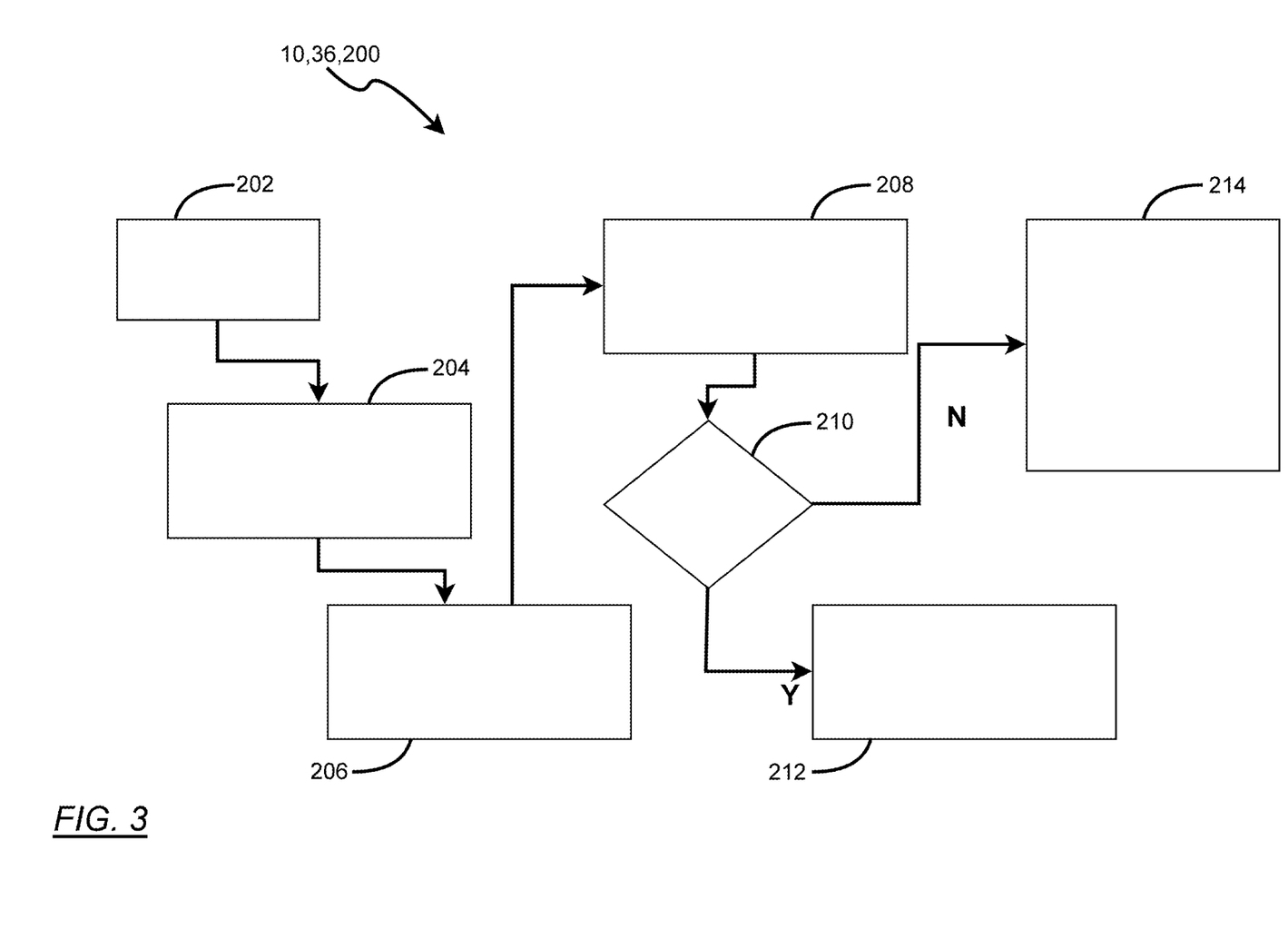
FIG. 3 is a flowchart depicting a cargo and upfitting control logic of the system and method for automated vehicle readiness and upfitting monitoring for efficient fleet management of FIG. 1 according to an exemplary embodiment.

Turning now to FIG. 3 and with continuing reference to FIGS. 1 and 2, the FMA 36 also includes a cargo and upfitting (CU) control logic 200. In many fleet applications, vehicles 12 may be used for a variety of different tasks, and each such task may require the use of a distinct tools, equipment, supplies, fixtures, and other such cargo 15. In some examples, the vehicles 12 are equipped with the tools, equipment, fixtures, supplies or other such cargo 15 on a daily, weekly, monthly, or other such periodic basis. In other examples, the vehicles 12 of the fleet are equipped with the tools, equipment, supplies, fixtures, or other such cargo 15 on a per job basis. It will be appreciated that in some circumstances, fleet vehicles 12 may not be fully retrofitted or upfitted with all of the tools, equipment, supplies, fixtures, or other such cargo 15 necessary to perform every fleet vehicle 12 function every day, or that partially-equipped vehicles 12 may be required for additional tasks within the fleet. Accordingly, the CU control logic 200 tracks and reports to the fleet manager 38 a cargo and upfitting status of the vehicles 12 in the fleet so that the vehicles 12 of the fleet may be efficiently and effectively used regardless of their fully or partially-upfitted state.

The CU control logic 200 begins at block 202 where the FMA 36 determines that a vehicle 12 within the fleet of managed vehicles 12 is being upfitted. The upfitting detection carried out at block 202 can be accomplished in a number of different manners, including but not limited to: fleet manager 38 selection or input directly to the HMI 40 to select one or more of the fleet vehicles 12, as well as ignition position detection, vehicle 12 power status, movement detection, location information, and the like. Upon determining that the vehicle 12 is being upfitted, the CU control logic 200 proceeds to block 204 where the sensors 16 equipped to the vehicle 12 are activated to monitor upfitting work. In several examples, the motion sensors 16 equipped to the vehicle 12, including cargo compartment camera 18A, passenger compartment camera 18B, and surround view cameras 18C are activated and monitor movement of people, supplies, tools, fixtures, equipment and other such cargo 15 in relation to the vehicle 12. At block 206, the sensors 16, and in particular, the cameras 18 of the vehicle 12 capture videos and images of upfitting work being done to and around the vehicle 12. At block 208, algorithms stored in the memory 28 of the controllers 24 analyzes the captured images and video to determine an upfitting status of the vehicle 12. The algorithms may be any of a wide variety of different types of algorithms without departing from the scope or intent of the present disclosure. In examples, the algorithms may include artificial intelligence (AI), machine learning (ML), deep neural network (DNN) algorithms, including an object detection algorithm or the like. In general, the algorithms compare the captured image and video data to predetermined upfitting target information. The upfitting target information includes a quantity and placement of supplies, tools, fixtures, and equipment and other such cargo 15 on or within the vehicle 12 for the particular upfit purpose indicated by the fleet manager 38.

The fleet manager 38 determines the upfit vehicle 12 purpose either for specific or more general purposes. That is, the fleet manager 38 may determine that the vehicle 12 is to be used for a particular task, or a more general purpose. For example, the vehicle 12 may be used only for transit of workers, and the upfit status may require that the vehicle 12 be equipped with seating optimized to provide a maximum allowable quantity of people to be safely transported within the vehicle 12. In other examples, the vehicle 12 may be used to carry plumbing supplies, and therefore may be required to carry lengths of pipe on racks that are installed within the vehicle 12 cargo compartment 14, as well as tool boxes that are mounted to the interior of the cargo compartment 14 while only allowing space for a driver and a passenger seat. However, it should be appreciated that the vehicles 12 may have additional or different use cases, requiring different types of upfitting, without departing from the scope or intent of the present disclosure.

At block 210, upon determining that the upfitting work has been completed, the CU control logic 200 proceeds to block 212 where the sensors 16 continue to monitor and record information regarding the upfitting work that has been done, including the addition, removal, tampering with, or movement of materials, tools, supplies, equipment, fixtures, and other such cargo 15 within the vehicle 12 cargo compartment 14. The recorded and monitored information is reported to the fleet manager 38.

However, when at block 210, the vehicle 12 upfitting is incomplete, the CU control logic 200 proceeds to block 214 where the CU control logic 200 causes the sensors 16 to continue to monitor and record information about the upfitting status of the vehicle and make a detailed report of a current upfitting status of the vehicle 12. In addition, at block 214, the CU control logic 200 utilizes the current upfitting status of the vehicle 12 to determine possible use cases of the partially or incompletely upfitted vehicle 12, and shares the possible alternate use cases with the fleet manager 38. That is, the CU control logic 200 includes a suggested vehicle 12 downtime mitigation strategy that reduces idle or down-time for vehicles 12 in the fleet from a first level to a second level lower than the first level, even when such vehicles 12 are not fully upfit, by ensuring that partially or incompletely upfit vehicles 12 may be used for alternate purposes. In several non-limiting examples, a partially upfitted vehicle 12 may be used in its partially upfit state to transport people, supplies, tools, materials, equipment, fixtures, and other such cargo 15 unless or until the vehicle 12 has been fully and completely upfitted for its intended purpose within the fleet. The vehicle fleet manager is subsequently prompted to select one of the alternate use cases, or allow the partially or incompletely upfit vehicle 12 to remain idle. The CU control logic 200 of the FMA 36 is used both to monitor initial installation work on a vehicle 12 in the fleet, as well as lifetime management of the vehicle 12. That is, the upfitting status of the vehicles 12 in the fleet may be constantly, intermittently, or periodically monitored over the lifespan of the vehicles 12 to determine whether the vehicles 12 are properly and fully upfit for their intended uses. Moreover, the vehicles 12 are monitored to determine current upfitting status with regards to the addition, removal, movement of, or tampering with supplies, tools, materials, equipment, fixtures, and other such cargo 15 of the vehicle 12 during the lifespan of the vehicle 12.

Figure 4:
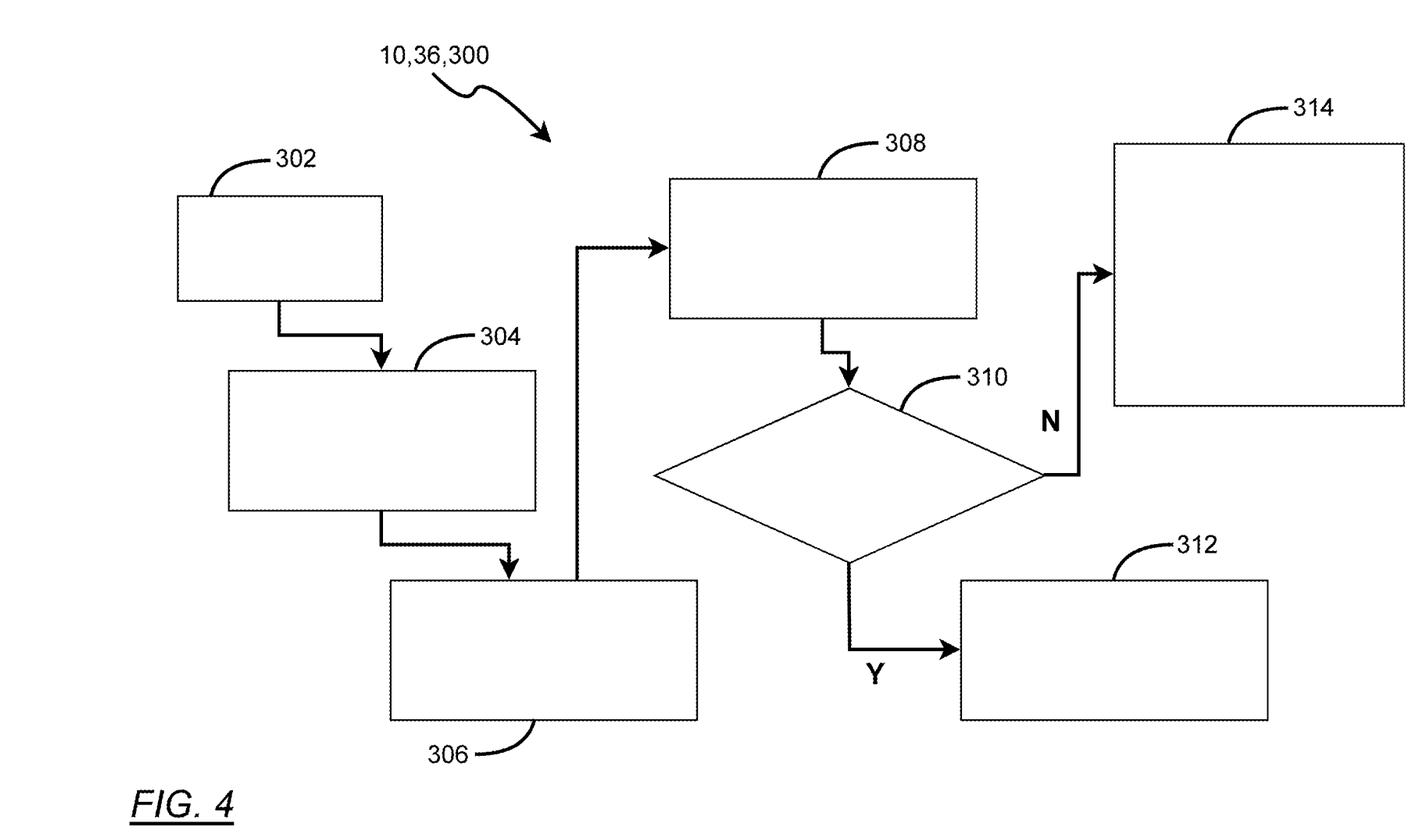
FIG. 4 is a flowchart depicting vehicle daily readiness control logic of the system and method for automated vehicle readiness and upfitting monitoring for efficient fleet management of FIG. 1 according to an exemplary embodiment.

Turning now to FIG. 4 and with continuing reference to FIGS. 1-3, the FMA 36 also includes a vehicle daily readiness (VDR) control logic 300. As previously noted, in many fleet applications, vehicles 12 may be used for a variety of different tasks, and each such task may require the use of a distinct tools, equipment, supplies, fixtures, and other such cargo 15. Accordingly, in order to ensure that the vehicles 12 within a fleet are outfitted correctly with necessary tools, equipment, supplies, materials, fixtures, or other such cargo 15 for their given task, the VDR control logic 300 is used to ensure that the vehicles 12 assigned to a given task are properly outfitted for the given task. The VDR control logic 300 begins at block 302 where the fleet manager 38 utilizes the FMA 36 to assign tasks to vehicles 12 within the fleet. In non-limiting examples, vehicles 12 within a fleet may be assigned to transport people, goods, supplies, tools, equipment, materials, fixtures, or other such cargo 15 to various locations or for various jobs without departing from the scope or intent of the present disclosure. Upon being assigned to a given task, the VDR control logic 300 of each vehicle 12 proceeds to block 304 where the sensors 16 equipped to the vehicle 12 are activated to detect and monitor the required materials, goods, supplies, tools, equipment, fixtures, or other such cargo 15 that are necessary to complete the assigned task. In several examples, the motion sensors 16 equipped to the vehicle 12, including cargo compartment camera 18A, passenger compartment camera 18B, and surround view cameras 18C are activated and monitor movement of people, supplies, tools, fixtures, equipment and other such cargo 15 in relation to the vehicle 12.

At block 306, the sensors 16, and in some non-limiting examples, the cameras 18 of the vehicle 12 capture videos and images of the work being done to the vehicle 12, including vehicle 12 status such as the presence or absence of required supplies, including, but not limited to: materials, goods, supplies, tools, equipment, fixtures, and other such cargo 15 necessary for the assigned vehicle 12 task. At block 308, algorithms stored in the memory 28 of the controllers 24 analyzes the captured images and video to determine an whether all necessary supplies are present in the vehicle 12. The algorithms may be any of a wide variety of different types of algorithms without departing from the scope or intent of the present disclosure. In examples, the algorithms may include artificial intelligence (AI), machine learning (ML), deep neural network (DNN) algorithms, or the like. In general, the algorithms compare the captured image and video data to target supply or vehicle 12 status information. The target supply or vehicle 12 status information includes a quantity and placement of supplies, tools, fixtures, equipment and other such cargo 15 for the assigned task for a particular vehicle 12.

At block 310, upon determining that all necessary supplies are in place and that the vehicle 12 is otherwise fit for the assigned purpose, the VDR control logic 300 proceeds to block 312 where the sensors 16 continue to monitor and record information regarding the vehicle 12 status, and sends notification to the fleet manager 38 via the FMA 36. In several aspects, the notification generated at block 312 includes a "check completed" notification, a "ready to go" notification, or the like. Upon receipt of the "check completed", "ready to go", or other such notification, the fleet manager 38 is assured that the vehicle 12 is ready for the assigned task.

However, when at block 310, the necessary supplies are not all complete or all in place in the vehicle 12, the VDR control logic 300 proceeds to block 314 where the VDR control logic 300 causes the sensors 16 to continue to monitor and record information about the status of the vehicle 12 and make a detailed report of the assigned task readiness status of the vehicle 12 in relation to the supplies within or otherwise currently equipped to the vehicle 12. The current assigned task status for the vehicle 12 is sent to the fleet manager 38 via the FMA 36.

It should be further appreciated that the APD control logic 100, the CU control logic 200, and/or the VDR control logic 300, may also be utilized to ascertain a current and estimated future status of the vehicle 12 in relation to a crash or other incident. That is, the APD control logic 100 may be utilized to determine when and whether the vehicle 12 has been involved in a crash, collision, or the like, and will provide direct notifications to the fleet manager 38 via the HMI 40 regarding the current vehicle 12 status. Similarly, the CU control logic 200 will provide a current status of the vehicle 12 including a repair status or repair progress status after the vehicle 12 has been involved in a crash or collision that causes the vehicle 12 to require repair. Such repair progress or repair status information is made available to the fleet manager 38 via the HMI 40. In further examples, the VDR control logic 300 will present, via the HMI 40, a vehicle 12 daily readiness status when the vehicle 12 has been involved in a crash, collision, or other such incident. Even while the vehicle 12 is in a state of partial repair, so long as the vehicle 12 is roadworthy or meets certain off-road requirements, the FMA 36, via the CU control logic 200 and the VDR control logic 300 may determine an alternate task that may be assigned to the vehicle 12 despite the vehicle's 12 status.

Figure 5:
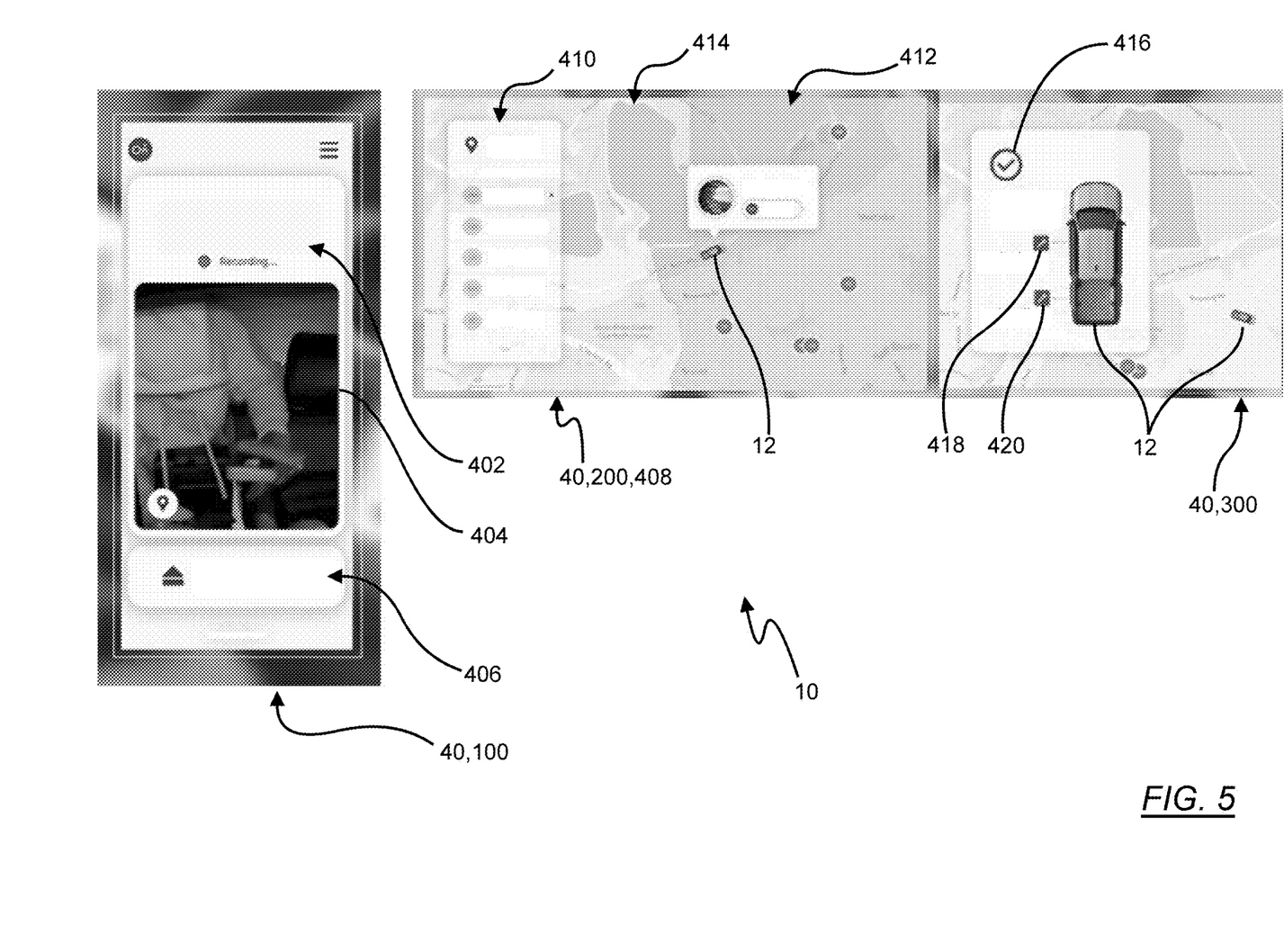
FIG. 5 is a series of views of a human machine interface of the system and method for automated vehicle readiness and upfitting monitoring for efficient fleet management including depictions of aspects of the authorized person detection control logic of FIG. 2, the cargo and upfitting control logic of FIG. 3, and the vehicle daily readiness control logic of FIG. 4 according to an exemplary embodiment.

Turning now to FIG. 5, and with continuing reference to FIGS. 1-4, when the FMA 36 sends information to the fleet manager 38, the information, including data from the APD control logic 100, the CU control logic 200, and/or the VDR control logic 300 is sent either directly or indirectly from the vehicle 12 to the fleet manager 38, who receives the information on the HMI 40. As shown in FIG. 5, the APD control logic 100 receives the information from block 114 of FIG. 2, including the real-time notifications 402 of movements of the unauthorized person, video 404 of the unauthorized person's movements, a status indicator 406 indicating that the video 404 is being relayed to a fleet manager 38, and/or to law enforcement, and alerts associated therewith.

Likewise, the location information 408 and upfitting status information of the vehicle 12 from the CU control logic 200 at block 214 is displayed upon the HMI 40. The FMA 36 provides location sensitive vehicle 12 tracking that allows the fleet manager 38 to track the location of the vehicles 12 within the fleet in real-time. In several aspects, the location information 408, utilized both by the FMA 36 and the fleet manager 38, may include an authorized driver list 410 and associated authorized territories or ranges for each of the authorized drivers in the authorized driver list 410, as indicated by shaded region 412, as well as regions or areas where each authorized driver in the authorized driver list 410 is not authorized to utilize the vehicle 12, as indicated by unshaded region 414. When the APD control logic 100 is enabled, the vehicle 12 may automatically engage with one or more law enforcement agencies under predefined circumstances. In a specific non-limiting example, based on the vehicle 12 location, and proximity to boundaries of authorized territories, or any other safety-critical or safety-implicated location, the vehicle 12 tracking is boosted to constantly monitor and report unusual activities of the vehicle 12 and activities of people proximate to the vehicle 12. A real-time report is sent to the fleet manager 38 and, depending on the criticality of the vehicle's 12 location and/or the occurrence of unusual activities by people proximate the vehicle 12, the system 10 may automatically and immediately contact law enforcement, request the dispatch of emergency services to the vehicle's 12 locations, or the like.

Similarly, vehicle 12 readiness status from the VDR control logic 300 at block 314 is reported and displayed on the HMI 40 within the FMA 36. The vehicle 12 readiness status may include a vehicle safety indicator 416 that provides at-a-glance indicia of whether the vehicle 12 cargo has been properly secured within or to the vehicle 12. Information used to determine whether the vehicle 12 is ready for the assigned task and safely outfitted, includes whether door locks are engaged 418, seatbelts are in use by the vehicle 12 occupants, whether a toolbox 420 is properly secured to the vehicle 12, and the like. Additional similar notifications indicating readiness for an assigned vehicle 12 task are intended to be captured within the scope of the present disclosure.

A system 10, and method utilizing the FMA 36 of the present disclosure offer several advantages. These include making use of preexisting or retrofittable hardware to provide automated incident detection and reporting, including: automatically identifying authorized users, unauthorized access and unauthorized utilization, optimize vehicle 12 lifetime utilization by mitigating vehicle 12 downtime through providing suggestions for alternate tasks, notifying fleet managers 38 proactively about vehicle 12 completed, ongoing, or future upfitting and repair work, highlighting vehicle 12 usability limitations including upfitting work and components necessary to complete upfitting work, and providing location-based tracking, utilization, and reporting the same, as well as decreasing a potential for tampering with vehicles 12 and vehicle 12 contents without increasing system complexity.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for automated vehicle readiness and upfitting monitoring for efficient fleet management comprising:
   at least one vehicle;
   a plurality of sensors disposed on the at least one vehicle and collecting real-time information about the at least one vehicle and surroundings of the at least one vehicle, each of the plurality of sensors having a distinct field of view of the at least one vehicle or of the surroundings of the at least one vehicle;
   a human machine interface (HMI) accessible by a vehicle fleet manager; a cloud computing server;
   a controller having a processor, a memory, and one or more input/output (I/O) ports, the I/O ports communicating with the plurality of sensors, the HMI and the cloud computing server, the processor executing programmatic control logic stored in the memory, the programmatic control logic including a fleet management application (FMA) comprising:
   a first control logic for authorized person detection (APD);
   a second control logic for cargo and upfitting (CU) management; and
   a third control logic for vehicle daily readiness (VDR) management;
   wherein outputs from the first, second and third control logics are transmitted via the I/O ports either directly or indirectly to the HMI and the cloud computing server, and wherein the FMA generates a suggested vehicle downtime mitigation strategy to the vehicle fleet manager based on the outputs from the first, second, and third control logics.

2. The system of claim 1, wherein the first control logic further comprises:
   control logic that causes the vehicle fleet manager to populate a database of people who are authorized users of the at least one vehicle, the database hosted on the cloud computing server.

3. The system of claim 2, wherein the first control logic further comprises:
   control logic that utilizes the plurality of sensors to monitor the at least one vehicle and the surroundings of the at least one vehicle;
   control logic that, from data from the plurality of sensors, determines that the at least one vehicle is parked;
   control logic that detects movement within one or more fields of view of the plurality of sensors; and control logic that determines that a person is approaching or is within the at least one vehicle.

4. The system of claim 3, wherein the first control logic further comprises:
control logic that analyzes sensor data and compares the person approaching or within the at least one vehicle to profiles of authorized users stored in the database of authorized users of the at least one vehicle; and
control logic that generates a notification to the HMI based on unusual or unexpected acts by authorized persons interacting with the at least one vehicle; and
control logic that actively and immediately generates a notification to the HMI that informs the vehicle fleet manager that an unauthorized person is interacting with the at least one vehicle, continuously records actions taken by the unauthorized person, and prepares a detailed report of the unauthorized person's actions; and
control logic that generates a suggested response to unauthorized use of the at least one vehicle by either an authorized person or an unauthorized person.

5. The system of claim 1, wherein the second control logic further comprises:
control logic that, from data from the plurality of sensors, determines that the at least one vehicle is being upfitted;
control logic that utilizes the plurality of sensors to continuously monitor the at least one vehicle and the surroundings of the at least one vehicle; and
control logic that analyzes the data from the plurality of sensors and compares the data from the plurality of sensors to predetermined upfitting target information.

6. The system of claim 5, wherein the control logic that analyzes the data from the plurality of sensors and compares the data from the plurality of sensors to predetermined upfitting target information further comprises:
one or more of an artificial intelligence (AI) algorithm, a machine learning (ML) algorithm, and a deep neural network (DNN) algorithm including an object detection algorithm; and
compares a quantity and placement of materials, supplies, tools, fixtures, and equipment on or within the at least one vehicle to the predetermined upfitting target for each upfitting purpose selected by the vehicle fleet manager.

7. The system of claim 6, wherein the second control logic further comprises:
control logic that determines an upfitting completion status and generates a notification to the HMI that informs the vehicle fleet manager of the upfitting completion status;
control logic that generates and transmits to the HMI a report including the information about the upfitting work that has been completed, including: addition, removal, tampering with, or movement of materials, tools, supplies, equipment, and fixtures within or on the at least one vehicle; and
control logic that selectively reports that the upfitting work on the at least one vehicle has been completed or that the upfitting work has not been completed, depending on whether the upfitting target has been achieved.

8. The system of claim 7, wherein the second control logic further comprises:
control logic that, upon determining that the upfitting target has not been achieved, engages the suggested vehicle downtime mitigation strategy to reduces downtime or idle time for each of the at least one vehicles that has not been completely upfit from a first level to a second level less than the first level by:
notifying the vehicle fleet manager of one or more possible alternate use cases for each of the at least one vehicles for which upfitting work is incomplete; and
causing the vehicle fleet manager to select at least one of the one or more possible alternate use cases.

9. The system of claim 1, wherein the third control logic further comprises:
control logic that receives, from the HMI, a command from the vehicle fleet manager that assigns one or more tasks to the at least one vehicle;
control logic that, from data from the plurality of sensors, determines that the at least one vehicle is properly equipped for an assigned task;
control logic that activates the plurality of sensors and causes the sensors to monitor the at least one vehicle and the surroundings of the at least one vehicle; and
control logic that analyzes the data from the plurality of sensors and compares the data from the plurality of sensors to predetermined requirements for the assigned task.

10. The system of claim 9, wherein the control logic that analyzes the data from the plurality of sensors and compares the data from the plurality of sensors to predetermined requirements for the assigned task further comprises:
one or more of an artificial intelligence (AI) algorithm, a machine learning (ML) algorithm, and a deep neural network (DNN) algorithm including an object detection algorithm; and
compares a quantity and placement of materials, supplies, tools, fixtures, and equipment on or within the at least one vehicle to the predetermined requirements for the assigned task.

11. The system of claim 10, wherein the third control logic further comprises:
control logic that, from the quantity and placement of materials, supplies, tools, fixtures, and equipment on or within the at least one vehicle and the predetermined requirements for the assigned task, determines an vehicle daily readiness status and generates a notification to the HMI that informs the vehicle fleet manager of the vehicle daily readiness status of the at least one vehicle;
control logic that selectively generates and transmits, to the HMI, a report including a "check completed" notification, or a "ready to go" notification, when the at least one vehicle satisfies the predetermined requirements for the assigned task; and
control logic that selectively generates and transmits, to the HMI, a detailed report of an assigned task readiness status of the at least one vehicle in relation to a current status of the materials, supplies, tools, fixtures, and equipment on or within the at least one vehicle when the at least one vehicle does not satisfy the predetermined requirements for the assigned task.

12. A method for automated vehicle readiness and upfitting monitoring for efficient fleet management comprising:
collecting real-time information about at least one vehicle and surroundings of the at least one vehicle with a plurality of sensors equipped to the at least one vehicle, each of the plurality of sensors having a distinct field of view of the at least one vehicle or of the surroundings of the at least one vehicle;
accessing, by a vehicle fleet manager, a human machine interface (HMI);

executing programmatic control logic stored in memory of a controller, the controller having a processor, and one or more input/output (I/O) ports, the I/O ports communicating with the plurality of sensors, the HMI and a cloud computing server, the programmatic control logic including a fleet management application (FMA) comprising:
  performing authorized person detection (APD);
  performing cargo and upfitting (CU) management; and
  performing vehicle daily readiness (VDR) management; and
  generating and transmitting, via the I/O ports, either directly or indirectly to the HMI and the cloud computing server, outputs from the APD, CU management and VDR management, including a suggested vehicle downtime mitigation strategy viewable by the vehicle fleet manager.

13. The method of claim 12, further comprising:
  causing the vehicle fleet manager to populate a database, of people who are authorized users of the at least one vehicle, the database hosted on the cloud computing server;
utilizing the plurality of sensors to monitor the at least one vehicle and the surroundings of the at least one vehicle;
  determining, from data from the plurality of sensors, that the at least one vehicle is parked;
  detecting, with the plurality of sensors, movement within one or more fields of view of the plurality of sensors; and
  determining that a person is approaching or is within the at least one vehicle.

14. The method of claim 13, further comprising:
  analyzing sensor data and compares the person approaching or within the at least one vehicle to profiles of authorized users stored in the database of authorized users of the at least one vehicle; and
  generating a notification to the HMI based on unusual or unexpected acts by authorized persons interacting with the at least one vehicle; and
  actively and immediately generating a notification to the HMI that informs the vehicle fleet manager that an unauthorized person is interacting with the at least one vehicle, continuously records actions taken by the unauthorized person, and prepares a detailed report of the unauthorized person's actions; and
  generating a suggested response to unauthorized use of the at least one vehicle by either an authorized person or an unauthorized person.

15. The method of claim 12, further comprising:
  determining, from data from the plurality of sensors, that the at least one vehicle is being upfitted;
  utilizing the plurality of sensors to continuously monitor the at least one vehicle and the surroundings of the at least one vehicle; and
  analyzing the data from the plurality of sensors and comparing the data from the plurality of sensors to predetermined upfitting target information by executing one or more of an artificial intelligence (AI) algorithm, a machine learning (ML) algorithm, and a deep neural network (DNN) algorithm including an object detection algorithm to compare a quantity and placement of materials, supplies, tools, fixtures, and equipment on or within the at least one vehicle to the predetermined upfitting target for each upfitting purpose selected by the vehicle fleet manager.

16. The method of claim 15, further comprising:
  determining an upfitting completion status and generating a notification to the HMI that informs the vehicle fleet manager of the upfitting completion status;
  generating and transmits to the HMI a report including the information about the upfitting work that has been completed, including: addition, removal, tampering with, or movement of materials, tools, supplies, equipment, and fixtures within or on the at least one vehicle; and
  selectively reporting that the upfitting work on the at least one vehicle has been completed or that the upfitting work has not been completed, depending on whether the upfitting target has been achieved.

17. The method of claim 16, further comprising:
  engaging, upon determining that the upfitting target has not been achieved, the suggested vehicle downtime mitigation strategy to reduce downtime or idle time for each of the at least one vehicles that has not been completely upfit from a first level to a second level less than the first level by:
  notifying the vehicle fleet manager of one or more possible alternate use cases for each of the at least one vehicles for which upfitting work is incomplete; and
  causing the vehicle fleet manager to select at least one of the one or more possible alternate use cases.

18. The method of claim 12, further comprising:
  receiving, from the HMI, a command from the vehicle fleet manager that assigns one or more tasks to the at least one vehicle;
  determining, from data from the plurality of sensors, that the at least one vehicle is properly equipped for an assigned task;
  activating the plurality of sensors and causes the sensors to monitor the at least one vehicle and the surroundings of the at least one vehicle; and
  analyzing the data from the plurality of sensors and compares the data from the plurality of sensors to predetermined requirements for the assigned task by executing one or more of an artificial intelligence (AI) algorithm, a machine learning (ML) algorithm, and a deep neural network (DNN) algorithm including an object detection algorithm to compare a quantity and placement of materials, supplies, tools, fixtures, and equipment on or within the at least one vehicle to the predetermined requirements for the assigned task.

19. The method of claim 18, further comprising:
  determining, from the quantity and placement of materials, supplies, tools, fixtures, and equipment on or within the at least one vehicle and the predetermined requirements for the assigned task, a vehicle daily readiness status and generating a notification to the HMI that informs the vehicle fleet manager of the vehicle daily readiness status of the at least one vehicle;
  selectively generating and transmitting, to the HMI, a report including a "check completed" notification, or a "ready to go" notification, when the at least one vehicle satisfies the predetermined requirements for the assigned task; and
  selectively generating and transmitting, to the HMI, a detailed report of an assigned task readiness status of the at least one vehicle in relation to a current status of the materials, supplies, tools, fixtures, and equipment on or within the at least one vehicle when the at least one vehicle does not satisfy the predetermined requirements for the assigned task.

20. A method for automated vehicle readiness and upfitting monitoring for efficient fleet management comprising:

collecting real-time information about at least one vehicle and surroundings of the at least one vehicle with a plurality of sensors equipped to the at least one vehicle, each of the plurality of sensors having a distinct field of view of the at least one vehicle or of the surroundings of the at least one vehicle;

accessing, by a vehicle fleet manager, a human machine interface (HMI);

executing programmatic control logic stored in memory of a controller, the controller having a processor, and one or more input/output (I/O) ports, the I/O ports communicating with the plurality of sensors, the HMI and a cloud computing server, the programmatic control logic including a fleet management application (FMA) comprising:

performing authorized person detection (APD), wherein the APD includes:

causing the vehicle fleet manager to populate a database, of people who are authorized users of the at least one vehicle, the database hosted on the cloud computing server;

utilizing the plurality of sensors to monitor the at least one vehicle and the surroundings of the at least one vehicle;

determining, from data from the plurality of sensors, that the at least one vehicle is parked;

detecting, with the plurality of sensors, movement within one or more fields of view of the plurality of sensors;

determining that a person is approaching or is within the at least one vehicle;

analyzing sensor data and compares the person approaching or within the at least one vehicle to profiles of authorized users stored in the database of authorized users of the at least one vehicle;

generating a notification to the HMI based on unusual or unexpected acts by authorized persons interacting with the at least one vehicle; and actively and immediately generating a notification to the HMI that informs the vehicle fleet manager that an unauthorized person is interacting with the at least one vehicle, continuously records actions taken by the unauthorized person, and prepares a detailed report of the unauthorized person's actions; and generating a suggested response to unauthorized use of the at least one vehicle by either an authorized person or an unauthorized person;

performing cargo and upfitting (CU) management, including:

determining, from data from the plurality of sensors, that the at least one vehicle is being upfitted;

utilizing the plurality of sensors to continuously monitor the at least one vehicle and the surroundings of the at least one vehicle;

analyzing the data from the plurality of sensors and comparing the data from the plurality of sensors to predetermined upfitting target information by executing one or more of an artificial intelligence (AI) algorithm, a machine learning (ML) algorithm, and a deep neural network (DNN) algorithm including an object detection algorithm to compare a quantity and placement of materials, supplies, tools, fixtures, and equipment on or within the at least one vehicle to the predetermined upfitting target for each upfitting purpose selected by the vehicle fleet manager;

determining an upfitting completion status and generating a notification to the HMI that informs the vehicle fleet manager of the upfitting completion status;

generating and transmits to the HMI a report including the information about the upfitting work that has been completed, including: addition, removal, tampering with, or movement of materials, tools, supplies, equipment, and fixtures within or on the at least one vehicle;

selectively reporting that the upfitting work on the at least one vehicle has been completed or that the upfitting work has not been completed, depending on whether the upfitting target has been achieved;

upon determining that the upfitting target has not been achieved, engaging a suggested vehicle downtime mitigation strategy to reduce downtime or idle time for each of the at least one vehicles that has not been completely upfit from a first level to a second level less than the first level by:

notifying the vehicle fleet manager of one or more possible alternate use cases for each of the at least one vehicles for which upfitting work is incomplete; and causing the vehicle fleet manager to select at least one of the one or more possible alternate use cases; and performing vehicle daily readiness (VDR) management, including:

receiving, from the HMI, a command from the vehicle fleet manager that assigns one or more tasks to the at least one vehicle;

determining, from data from the plurality of sensors, that the at least one vehicle is properly equipped for an assigned task;

activating the plurality of sensors and causes the sensors to monitor the at least one vehicle and the surroundings of the at least one vehicle;

analyzing the data from the plurality of sensors and compares the data from the plurality of sensors to predetermined requirements for the assigned task by executing one or more of an artificial intelligence (AI) algorithm, a machine learning (ML) algorithm, and a deep neural network (DNN) algorithm including an object detection algorithm to compare a quantity and placement of materials, supplies, tools, fixtures, and equipment on or within the at least one vehicle to the predetermined requirements for the assigned task;

determining, from the quantity and placement of materials, supplies, tools, fixtures, and equipment on or within the at least one vehicle and the predetermined requirements for the assigned task, a vehicle daily readiness status and generating a notification to the HMI that informs the vehicle fleet manager of the vehicle daily readiness status of the at least one vehicle;

selectively generating and transmitting, to the HMI, a report including a "check completed" notification, or a "ready to go" notification, when the at least one vehicle satisfies the predetermined requirements for the assigned task;

selectively generating and transmitting, to the HMI, a detailed report of the assigned task readiness status of the at least one vehicle in relation to a current status of the materials, supplies, tools, fixtures, and equipment on or within the at least one vehicle when the at least one vehicle does not satisfy the predetermined requirements for the assigned task; and generating and transmitting, via the I/O ports, either directly or indirectly to the HMI and the cloud computing server, outputs from the APD, CU management and VDR management, including a suggested vehicle downtime mitigation strategy viewable by the vehicle fleet manager.

* * * * *